(12) United States Patent
Kamo et al.

(10) Patent No.: US 12,444,543 B2
(45) Date of Patent: Oct. 14, 2025

(54) HIGH VOLTAGE CAPACITOR (71) Applicant: TDK CORPORATION, Tokyo (JP)

(72) Inventors: Yuta Kamo, Tokyo (JP); Hisashi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 232 days.

(21) Appl. No.: 18/354,923

(22) Filed: Jul. 19, 2023

(65) Prior Publication Data

US 2024/0071693 A1 Feb. 29, 2024

(30) Foreign Application Priority Data

Aug. 29, 2022 (JP) .................. 2022-135976

(51) Int. Cl.
*H01G 4/38* (2006.01)
*H01G 2/10* (2006.01)
*H01G 4/35* (2006.01)

(52) U.S. Cl.
CPC ............. *H01G 4/385* (2013.01); *H01G 2/103* (2013.01); *H01G 4/35* (2013.01)

(58) Field of Classification Search
CPC ....................................................... H01G 4/35
See application file for complete search history.

(56) References Cited

U.S. PATENT DOCUMENTS

| 5,896,267 A * | 4/1999 | Hittman ............... H03H 1/0007 29/25.42 |
| 2001/0036053 A1 | 11/2001 | Asada et al. |
| 2005/0142946 A1* | 6/2005 | Baek ....................... H01G 4/35 439/620.14 |

FOREIGN PATENT DOCUMENTS

JP 2001-351830 A 12/2001

\* cited by examiner

*Primary Examiner* — Timothy J. Dole
(74) *Attorney, Agent, or Firm* — Oliff PLC (57) ABSTRACT

A high voltage capacitor includes a pair of capacitors; a common conductor, and a pair of individual conductors. Each of the pair of capacitors includes an element body having a columnar shape with a first direction as an axial direction, and including a first side surface and a second side surface facing away each other in a second direction orthogonal to the first direction, a first electrode disposed on the first side surface and electrically connected to a corresponding individual conductor of the pair of individual conductors; and a second electrode disposed on the second side surface and electrically connected to the common conductor. The pair of capacitors is disposed in such a way that the first electrodes face each other in the second direction. The common conductor surrounds the pair of capacitors and the pair of individual conductors when viewed from the first direction.

18 Claims, 5 Drawing Sheets

HIGH VOLTAGE CAPACITOR

TECHNICAL FIELD

The present disclosure relates to a high voltage capacitor.

The present application is based upon and claims the benefit of the priority from Japanese patent application No. 2022-135976, filed on Aug. 29, 2022, which is hereby incorporated by reference in its entirety.

BACKGROUND

A known high voltage feed-through capacitor includes a capacitor, a pair of individual conductors, and a common conductor (see Japanese Unexamined Patent Application Publication No. 2001-351830, for example). The capacitor includes an element body in which a pair of through-holes are formed, and a first electrode and a second electrode provided on both surfaces of the element body in which the through-holes are opened. The first electrode is connected to an individual conductor inserted through the through-hole. The second electrode is connected to the common conductor.

SUMMARY

It is an object of one aspect of the present disclosure to provide a high voltage capacitor that improves reliability.

A high voltage capacitor according to one aspect of the present disclosure includes a pair of capacitors; a common conductor electrically connected to each of the pair of capacitors, and a pair of individual conductors electrically connected to a corresponding capacitor of the pair of capacitors. Each of the pair of capacitors includes an element body having a columnar shape with a first direction as an axial direction, and including a first side surface and a second side surface facing away each other in a second direction orthogonal to the first direction, a first electrode disposed on the first side surface and electrically connected to a corresponding individual conductor of the pair of individual conductors; and a second electrode disposed on the second side surface and electrically connected to the common conductor. The pair of capacitors is disposed in such a way that the first electrodes face each other in the second direction. The common conductor surrounds the pair of capacitors and the pair of individual conductors when viewed from the first direction.

The present inventors have investigated and studied a high voltage capacitor that improves reliability. As a result, the present inventors have newly found the following matters.

The strength of the electric field formed between two conductors having different potentials affects the reliability of the high voltage capacitor. Hereinafter, the strength of the electric field formed between two conductors having different potentials may be simply referred to as "interconductor electric field strength". The dielectric breakdown is likely to occur in a high voltage capacitor having a high interconductor electric field strength. The dielectric breakdown is caused by, for example, a discharge along the inner surface of the element body defining the through-hole. Therefore, in a high voltage capacitor adopting a configuration for reducing the interconductor electric field strength, dielectric breakdown is less likely to occur. That is, the high voltage capacitor adopting a configuration for reducing the interconductor electric field strength improves the reliability.

The present inventors have investigated and studied the configuration for reducing the interconductor electric field strength. As a result, the present inventors have found that the use of a pair of capacitors each including an element body having a columnar shape reduces the interconductor electric field strength. According to such a pair of capacitors, the degree of freedom in design is increased, and the distance between two conductors having different potentials can be increased. That is, the distance between the first electrode and the common conductor can be increased, and the distance between the second electrode and the individual conductor can be increased. As a result, the interconductor electric field strength is reduced.

In the one aspect, each of the pair of individual conductors may include a first portion electrically connected to the first electrode and a second portion connected to the first portion with a bent portion interposed between the first portion and the second portion. A distance by which the second portions are spaced apart from each other in the second direction may be longer than a distance by which the first portions are spaced apart from each other in the second direction. In this case, it is possible to suppress an increase in the size of the high voltage capacitor in the second direction while using the pair of second portions as a pair of tab connectors having a defined arrangement interval.

In the one aspect, in a third direction orthogonal to the first direction and the second direction, a length of the second portion may be longer than a length of the first portion. In this case, the pair of second portions can be used as a pair of tab connectors having a defined size.

In the one aspect, the element body and the common conductor may be spaced apart from each other in a third direction orthogonal to the first direction and the second direction. In this case, it is easy to increase the distance between the first electrode and the common conductor.

The high voltage capacitor according to the one aspect may further include an insulating case accommodating the pair of capacitors, and a resin filled inside the insulating case and sealing the pair of capacitors. In this case, it is possible to suppress occurrence of discharge between two conductors having different potentials.

DETAILED DESCRIPTION

Hereinafter, embodiments of the present invention will be described in detail with reference to the accompanying drawings. In the description, the same reference numerals are used for the same elements or elements having the same functions, and redundant description will be omitted.

Figure 1:
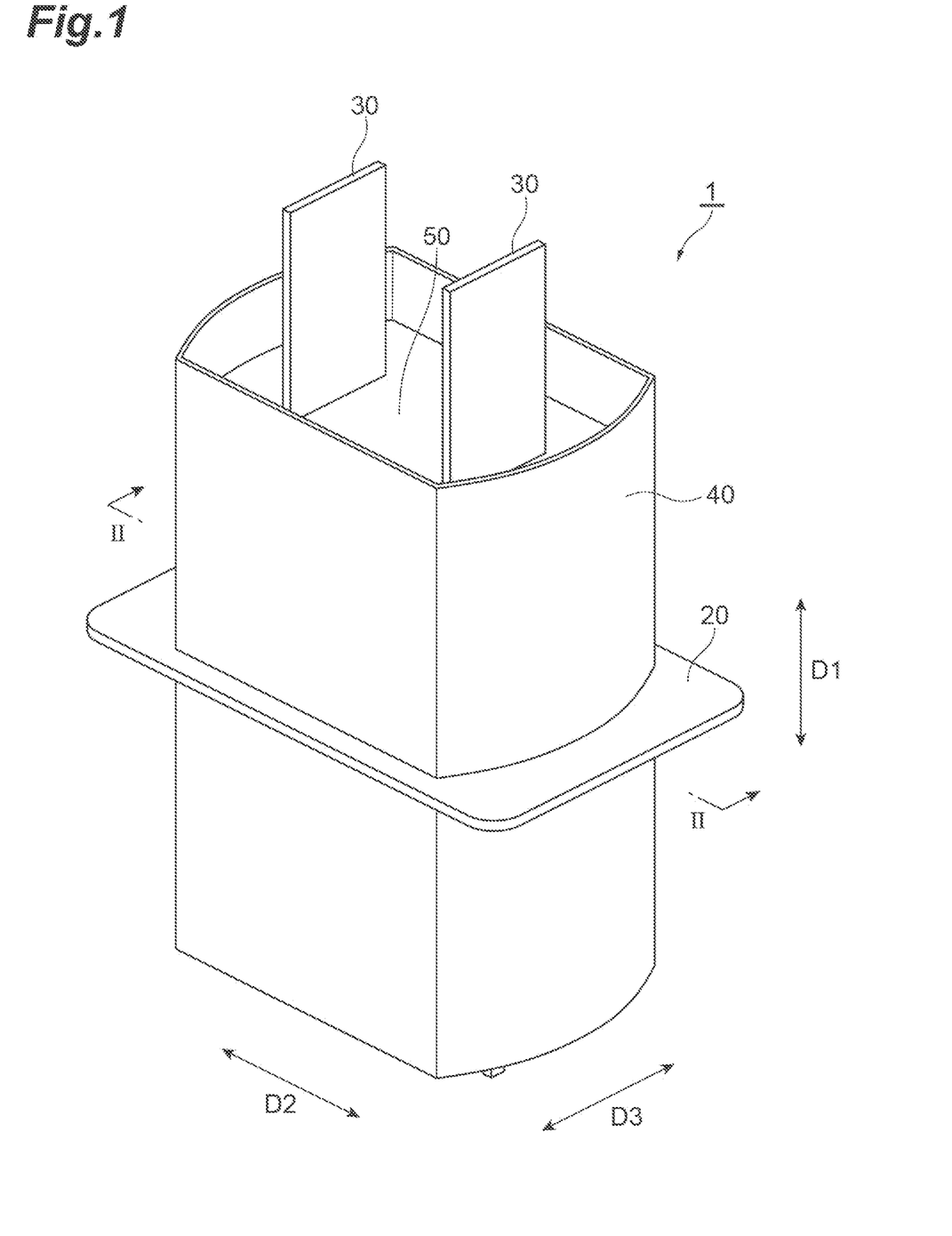
FIG. 1 is a perspective view of a high voltage capacitor according to an embodiment.
Figure 2:
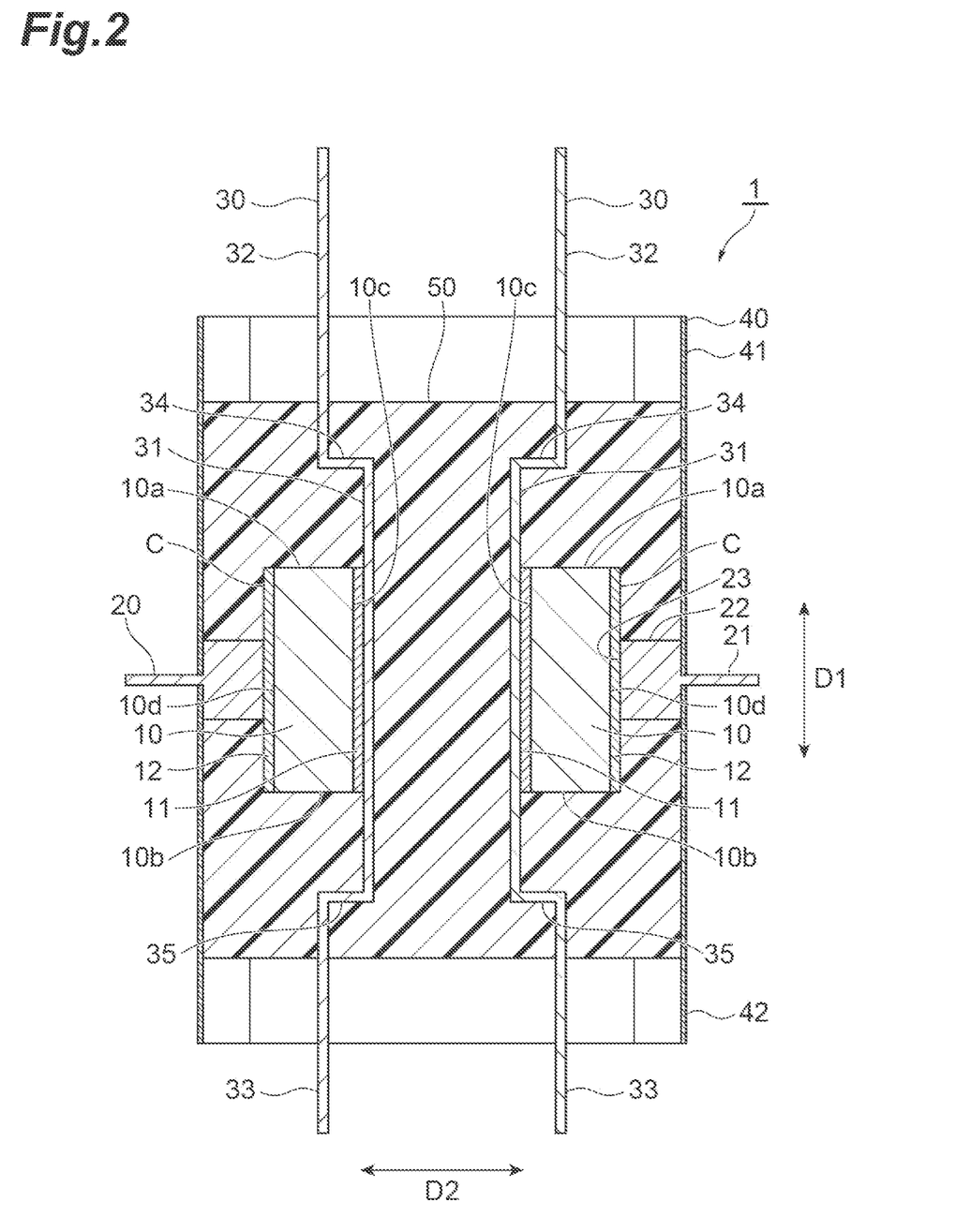
FIG. 2 is a cross-sectional view taken along line II-II of FIG. 1.
Figure 3:
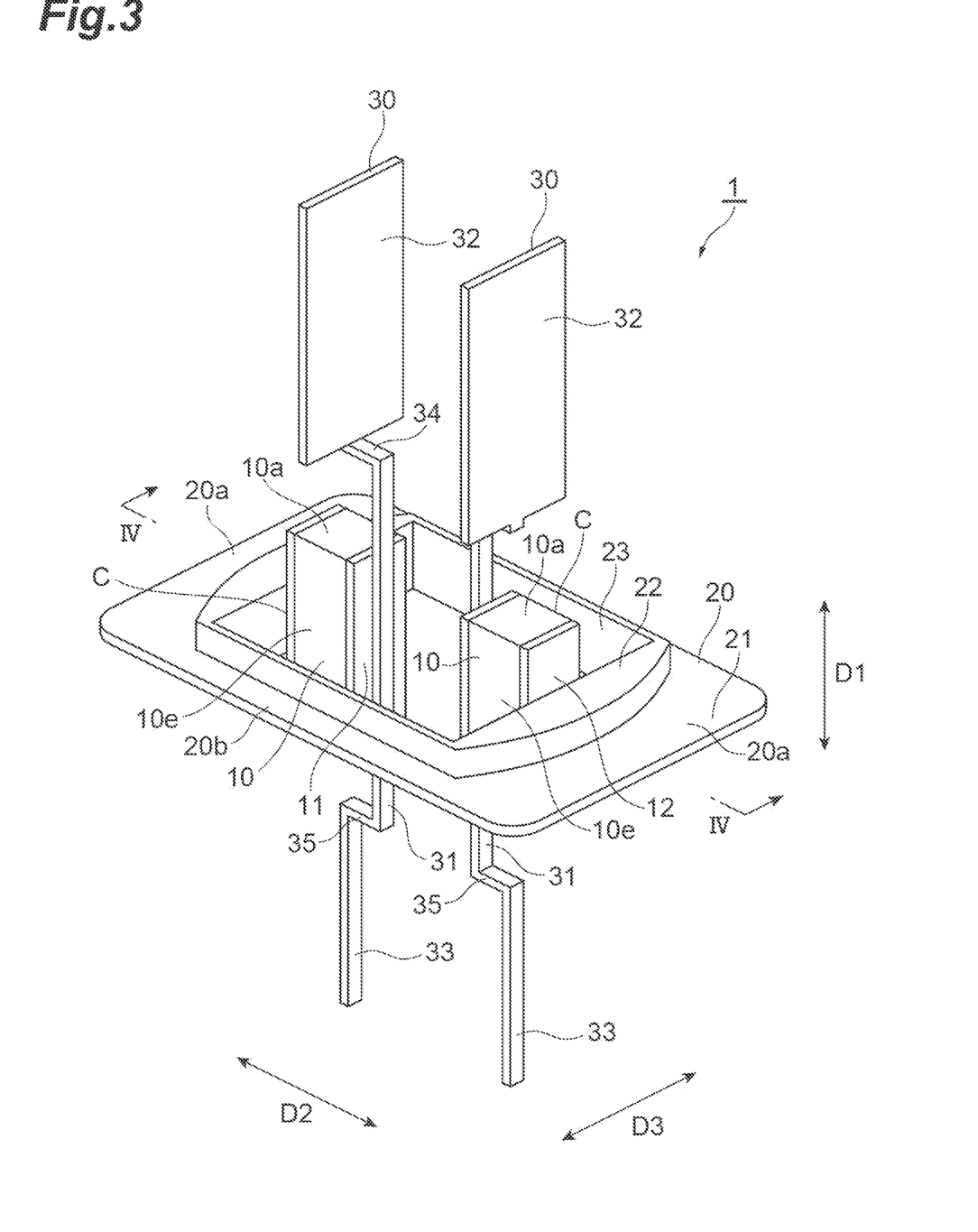
FIG. 3 is a perspective view showing a pair of capacitors, a common conductor, and a pair of individual conductors.
Figure 4:
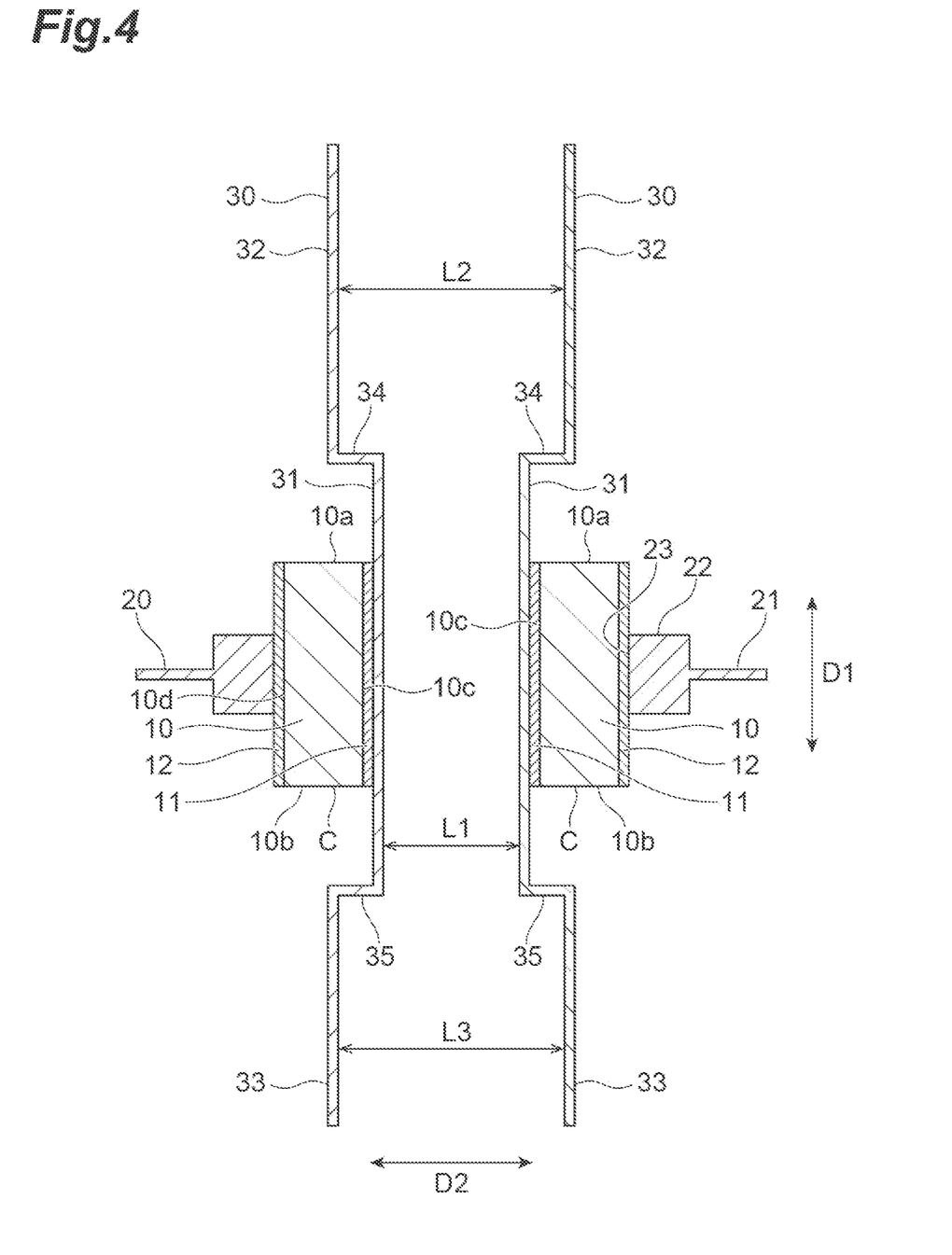
FIG. 4 is a cross-sectional view taken along line IV-IV of FIG. 3.
Figure 5:
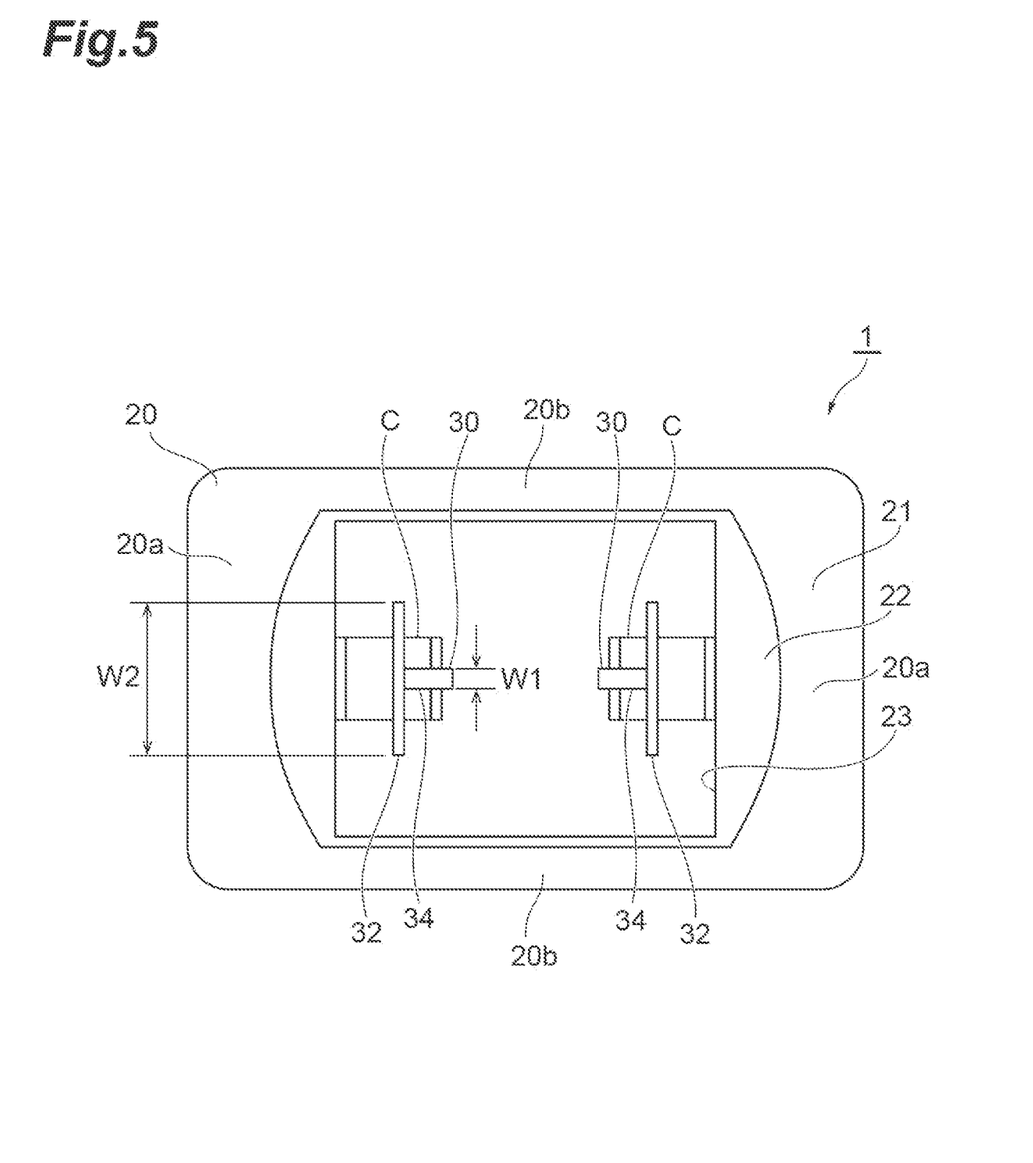
FIG. 5 is a plan view showing a pair of capacitors, a common conductor, and a pair of individual conductors.

The configuration of a high voltage capacitor 1 according to the present embodiment will be described with reference to FIGS. 1 to 5. FIG. 1 is a perspective view of a high voltage capacitor according to the present embodiment. FIG. 2 is a cross-sectional view taken along line II-II of FIG. 1. FIG. 3 is a perspective view showing a pair of capacitors, a common conductor, and a pair of individual conductors. FIG. 4 is a cross-sectional view taken along line IV-IV of FIG. 3. FIG. 5 is a plan view showing a pair of capacitors, a common conductor, and a pair of individual conductors. For example, the high voltage capacitor 1 may be connected to a magnetron for a microwave oven in the same manner as a conventional high voltage feed-through capacitor and prevents unnecessary radiation noise of the magnetron for the microwave oven.

As shown in FIGS. 1 to 5, the high voltage capacitor 1 includes a pair of capacitors C, a common conductor 20, a pair of individual conductors 30, an insulating case 40, and a resin 50. Each of the pair of capacitors C has an element body 10, a first electrode 11, and a second electrode 12.

The element body 10 has a columnar shape whose axial direction is a first direction D1. In the present embodiment, the element body 10 has a prismatic shape. It can also be said that the element body 10 has a rectangular parallelepiped shape. The element body 10 has a first end surface 10a and a second end surface 10b facing away from each other in the first direction D1, a first side surface 10c and a second side surface 10d facing away from each other in a second direction D2, and a pair of third side surfaces 10e facing away from each other in a third direction D3. The first direction D1, the second direction D2, and the third direction D3 intersect (here, are orthogonal to) each other.

The first side surface 10c, the second side surface 10d, and the pair of third side surfaces 10e extend in the first direction D1 to connect the first end surface 10a and the second end surface 10b. In the present specification, the direction from the second end surface 10b toward the first end surface 10a is the upward direction, and the first end surface 10a is located above the second end surface 10b.

The length of the element body 10 in the first direction D1 is longer than the length of the element body 10 in the second direction D2 and longer than the length of the element body 10 in the third direction D3. The length of the element body 10 in the first direction D1 is 5 mm or more and 15 mm or less, and is 11 mm as an example. The length of the element body 10 in the second direction D2 is 3 mm or more and 10 mm or less, and is 5 mm as an example. The length of the element body 10 in the third direction D3 is 3 mm or more and 10 mm or less, and is 4 mm as an example.

The element body 10 includes, for example, insulating material. The element body 10 includes, for example, ceramic. Ceramic include, for example, $BATiO_3$, $BaZrO_3$, $CaTiO_3$, or $MgTiO_3$. The element body 10 may include additives added to the ceramic. The additives include, for example, Si, Mg, Zr, Zn, Y, V, Al, or Mn.

The first electrode 11 is disposed on the first side surface 10c. The first electrode 11 covers the entire first side surface 10c. The first electrode 11 is electrically connected to the corresponding individual conductor 30. That is, the first electrode 11 of one capacitor C is electrically connected to one individual conductor 30. The first electrode 11 of the other capacitor C is electrically connected to the other individual conductor 30.

The second electrode 12 is disposed on the second side surface 10d. The second electrode 12 covers the entire second side surface 10d. The second electrode 12 is electrically connected to the common conductor 20. The first electrode 11 and the second electrode 12 face away from each other at the first direction D1. The element body 10 is disposed between the first electrode 11 and the second electrode 12. Thus, the first electrode 11 and the second electrode 12 are indirectly opposed to each other in the first direction D1 with the element body 10 interposed between the first electrode 11 and the second electrode 12.

The first electrode 11 and the second electrode 12 include conductive metal materials. The conductive metal materials include, for example, Ag. The first electrode 11 and the second electrode 12 may include magnetic material in addition to the conductive metal materials. The magnetic material is, for example, Fe, Co, Ni, Cu, or Sr, or a combination thereof. The first electrode 11 and the second electrode 12 are formed, for example, by baking conductive paste applied to the first side surface 10c and the second side surface 10d. The conductive paste for forming the first electrode 11 and the second electrode 12 includes the conductive metal materials.

The pair of capacitors C is spaced apart from each other in the second direction D2. The pair of capacitors C is disposed in such a way that the first electrodes 11 face each other in the second direction D2. The capacitors C have the same shape.

The common conductor 20 is electrically connected to each of the pair of capacitors C. The common conductor 20 is electrically connected to the second electrode 12. The common conductor 20 is a metal fitting that is grounded. The common conductor 20 includes a peripheral portion 21 and a central portion 22. The peripheral portion 21 surrounds the central portion 22. The central portion 22 is a thick portion formed to be thick. The peripheral portion 21 is a thin portion formed to be thin. The central portion 22 and the peripheral portion 21 are formed in such a way that center positions thereof in the thickness direction (the first direction D1) coincide with each other. The central portion 22 protrudes from both sides of the peripheral portion 21 in the first direction D1.

A opening 23 is formed in the central portion 22. The opening 23 passes through the central portion 22 in the first direction D1. In the present embodiment, the opening 23 is disposed in the central region of the central portion 22 when viewed from the first direction D1. When viewed from the first direction D1, the opening 23 has a rectangular shape whose long side direction is the second direction D2. When viewed from the first direction D1, the common conductor 20 has a rectangular shape whose long side direction is the second direction D2. The rectangular shape includes a shape whose corners are rounded and a shape whose corners are chamfered. The common conductor 20 may have a shape other than a rectangular shape.

It can also be said that the common conductor 20 has a rectangular frame shape in which the long side direction is the second direction D2. The common conductor 20 includes a pair of side portions 20a facing each other in the second direction D2 and a pair of side portions 20b facing each other in the third direction D3. The side portion 20a is a short side portion. The side portion 20b is a long side portion. Each of the side portions 20a and 20b includes the peripheral portion 21 and the central portion 22, respectively.

The common conductor 20 includes conductive metallic material. The conductive metal material includes, for example, Fe, Cu, or a Cu—Zn alloy.

The common conductor 20 surrounds the pair of capacitors C and the pair of individual conductors 30 when viewed from the first direction D1. Each capacitor C is inserted through the opening 23 in such a way that the second electrode 12 is joined to the central portion 22 inside the opening 23. The second electrode 12 of one capacitor C is joined to the central portion 22 of one side portion 20a. The second electrode 12 of the other capacitor C is joined to the central portion 22 of the other side portion 20a. The second electrode 12 is joined to the central portion 22 by solder.

Each side portion 20b is spaced apart from the pair of capacitors C in the third direction D3. That is, the element body 10 and the common conductor 20 are spaced apart from each other in the third direction D3. The capacitor C is equally spaced from the pair of side portions 20b.

The length of the common conductor 20 in the second direction D2 is 20 mm or more and 50 mm or less, and is 32 mm as an example. The length of the common conductor 20 in the third direction D3 is 10 mm or more and 30 mm or less, and is 20 mm as an example. The thicknesses (the length in the first direction D1) of the central portion 22 is 4 mm as an example. The thickness (the length in the first direction D1) of the peripheral portion 21 is 0.6 mm as an example. The length of the opening 23 in the second direction D2 is 10 mm or more and 40 mm or less, and is 18 mm as an example. The length of the opening 23 in the third direction D3 is 5 mm or more and 25 mm or less, and is 15 mm as an example. The distance by which each side portion 20b and each capacitor C are apart from each other in the third direction D3 is 1.5 mm or more, and is 5.5 mm as an example.

Each of the pair of individual conductors 30 is electrically connected to the corresponding capacitor C. The pair of individual conductors 30 is inserted into the opening 23 together with the pair of capacitors C. The pair of individual conductors 30 is disposed between the pair of capacitors C and faces each other in the second direction D2. The individual conductors 30 have the same shape. The individual conductor 30 is electrically connected to the first electrode 11 of the corresponding capacitor C.

The individual conductor 30 includes a first portion 31, a second portion 32, a third portion 33, a bent portion 34, and a bent portion 35. The first portion 31, the second portion 32, and the third portion 33 extend in the first direction D1. The bent portion 34 and the bent portion 35 extend in the second direction D2. The first portion 31 is electrically connected to the first electrode 11. The first portion 31 is joined to the first electrode 11 by solder. The second portion 32 is connected to the upper end of the first portion 31 with the bent portion 34 interposed between the first portion 31 and the second portion 32. The third portion 33 is connected to the lower end of the first portion 31 with the bent portion 35 interposed between the first portion 31 and the third portion 33.

The distance L2 by which the second portions 32 are spaced apart from each other in the second direction D2 is longer than the distance L1 by which the first portions 31 are spaced apart from each other in the second direction D2. The distance L3 by which the third portions 33 are spaced apart from each other in the second direction D2 is longer than the distance L1. The distance L2 is longer than the distance L3. The distance L2 and the distance L3 are 5 mm or more and 35 mm or less. The length of the individual conductor 30 in the first direction D1 is 30 mm or more and 60 mm or less. The length of the first portion 31 in the first direction D1 is longer than the length of the element body 10 in the first direction D1, and is 22 mm as an example. The length of the second portion 32 in the first direction D1 is 16 mm as an example. The length of the third portion 33 in the first direction D1 is 12 mm as an example. The length of the bent portion 34 in the second direction D2 is longer than or equal to the length of the bent portion 35 in the second direction D2.

In the third direction D3, the first portion 31, the third portion 33, the bent portion 34 and the bent portion 35 have the same length W1. In the third direction D3, the length W2 of the second portion 32 is longer than the length W1 of the first portion 31. That is, when viewed from the second direction D2, the second portion 32 is formed wider than the first portion 31. The second portion 32 functions as a tab connector. The individual conductor 30 is made of, for example, conductive metal material. The conductive metal material includes, for example, Fe, Cu, or a Cu—Zn alloy.

The insulating case 40 has a hollow cylindrical shape whose axial direction is the first direction D1. The insulating case 40 may have other shapes. The insulating case 40 accommodates the pair of capacitors C therein. In the present embodiment, the insulating case 40 accommodates the entirety of each capacitor C, a portion of the common conductor 20, and a portion of each individual conductor 30. The insulating case 40 is disposed so as to surround the pair of capacitors C and the pair of individual conductors 30. The peripheral portion 21 of the common conductor 20 is exposed from the insulating case 40. The peripheral portion 21 protrudes from the insulating case 40 over the entire circumference.

The insulating case 40 includes a first case 41 disposed above the common conductor 20 and a second case 42 disposed below the common conductor 20. The first case 41 surrounds the top of the capacitor C, the top of the first portion 31, the entire bent portion 34, the lower end of the second portion 32, and the top of the central portion 22. The second case 42 surrounds the lower portion of the capacitor C, the lower portion of the first portion 31, the entire bent portion 35, the upper end of the third portion 33, and the lower portion of the central portion 22.

The first case 41 and the second case 42 are physically connected to the common conductor 20. The first case 41 is connected to the common conductor 20 such that the inner surface of the first case 41 located at the lower end is in contact with the outer surface of the central portion 22. The lower end surface of the first case 41 is in contact with the upper surface of the peripheral portion 21. The second case 42 is connected to the common conductor 20 such that the inner surface of the second case 42 located at the upper end is in contact with the outer surface of the central portion 22. The upper end surface of the second case 42 is in contact with the upper surface of the peripheral portion 21.

The length of the first case 41 in the first direction D1 is 10 mm or more and 25 mm or less. The length of the first case 41 in the second direction D2 is 10 mm or more and 40 mm or less. The length of the first case 41 in the third direction D3 is 5 mm or more and 25 mm or less. The second case 42 has the same shape as the first case 41.

The insulating case 40 includes insulating material. The insulating material includes, for example, polybutylene terephthalate (PBT), polyethylene terephthalate (PET), or modified melamine. The insulating material may contain an inorganic substance. The inorganic material includes, for example, glass powder and ceramic powder. The glass powder includes, for example, industrial glass powder. The ceramic powder includes, for example, $SiO_2$ powder, $Al_2O_3$ powder, talc ($Mg_3Si_4O_{10}(OH)_2$), aluminum nitride (AlN), or silicon nitride ($Si_3N_4$), or a mixture thereof.

The resin 50 is filled inside the insulating case 40 and seals the pair of capacitors C. In the embodiment, the resin 50 is filled inside the insulating case 40 to cover the capacitor C. The resin 50 is located between the insulating case 40 and each of the capacitor C, the common conductor 20, and the individual conductor 30. The resin 50 bridges between the insulating case 40 and each of the capacitor C, the common conductor 20 and the individual conductor 30.

The resin 50 is in contact with the capacitor C, the common conductor 20 and the individual conductor 30.

The upper end edge of the resin 50 has reached a position where the lower end portion of the second portion 32 is buried. The lower end edge of the resin 50 has reached a position where the upper end portion of the third portion 33 is buried. The remaining portion of the second portion 32 and the remaining portion of the third portion 33 are exposed from the resin 50. The upper end edge of the resin 50 refers to the upper end edge of the resin 50 in the first direction D1 and the lower end edge of the resin 50 refers to the lower end edge of the resin 50 in the first direction D1.

The resin 50 includes insulating material. The insulating material includes, for example, thermosetting resin. The thermosetting resin includes, for example, epoxy resin, urethane resin, phenol resin, or silicone resin. The resin 50 may include different insulating materials. In the present embodiment, the resin 50 contains epoxy resin.

The length of the high voltage capacitor 1 in the first direction D1 is equal to the length of the individual conductor 30 in the first direction D1, and is 30 mm or more and 60 mm or less. The length of the high voltage capacitor 1 in the second direction D2 is equal to the length of the common conductor 20 in the second direction D2, and is 20 mm or more and 50 mm or less. The length of the high voltage capacitor 1 in the third direction D3 is equal to the length of the common conductor 20 in the third direction D3, and is 10 mm or more and 30 mm or less.

As described above, in the high voltage capacitor 1, the pair of capacitors C each including the element body 10 having a columnar shape is used. This increases the degree of freedom in design, as compared to a configuration in which one capacitor having a plurality of through-holes is used. The distance between the first electrode 11 and the common conductor 20 can be increased, and the distance between the second electrode 12 and the individual conductor 30 can be increased. As a result, the interconductor electric field strength can be reduced. Therefore, the reliability can be improved in the high voltage capacitor 1.

Each of the pair of individual conductors 30 includes the first portion 31 electrically connected to the first electrode 11 and the second portion 32 connected to the first portion 31 with the bent portion 34 interposed between the first portion 31 and the second portion 32. The distance L2 by which the second portions 32 are spaced apart from each other in the second direction D2 is longer than the distance L1 by which the first portions 31 are spaced apart from each other in the second direction D2. For this reason, it is possible to suppress an increase in the size of the high voltage capacitor 1 in the second direction D2 while using the pair of second portions 32 as the pair of tab connectors having a defined arrangement interval.

The length W2 of the second portion 32 is longer than the length W1 of the first portion 31. Therefore, the pair of second portions 32 can be used as a pair of tab connectors having a defined size.

The element body 10 and the common conductor 20 are spaced apart from each other in the third direction D3. Therefore, the distance between the first electrode 11 and the common conductor 20 can be easily increased.

The insulating case 40 accommodates the pair of capacitors C therein. The resin 50 is filled inside the insulating case 40 and seals the pair of capacitors C. Therefore, the occurrence of discharge between the first electrode 11 and the common conductor 20 can be suppressed, and the occurrence of discharge between the second electrode 12 and the individual conductor 30 can be suppressed. The resin 50 can also impart moisture resistance to the high voltage capacitor 1.

Although the embodiments of the present invention have been described above, the present invention is not necessarily limited to the above-described embodiments, and various modifications can be made without departing from the scope of the present invention.

The high voltage capacitor 1 includes the pair of capacitors C and the pair of individual conductors 30, but the high voltage capacitor 1 may have three or more capacitors C and three or more individual conductors 30. The insulating case 40 consists of two parts, the first case 41 and the second case 42, but may also consist of one part. In this case, the insulating case 40 may be provided with a through-hole that exposes a circumferential part of the peripheral portion 21.

The element body 10 does not need to have a rectangular parallelepiped shape as long as it has a columnar shape in which the first direction D1 is the axial direction and has the first side surface 10c and the second side surface 10d which are flat and face away from each other in the second direction D2. For example, the pair of third side surfaces 10e may be curved surface. The individual conductor 30 may not include the bend portions 34 and 35.

The above-described embodiments and modifications may be appropriately combined.

What is claimed is:

1. A high voltage capacitor comprising:
   a pair of capacitors;
   a common conductor electrically connected to each of the pair of capacitors; and
   a pair of individual conductors electrically connected to a corresponding capacitor of the pair of capacitors,
   wherein each of the pair of capacitors comprises:
      an element body having a columnar shape with a first direction as an axial direction, and including a first side surface and a second side surface facing away each other in a second direction orthogonal to the first direction;
      a first electrode disposed on the first side surface and electrically connected to a corresponding individual conductor of the pair of individual conductors; and
      a second electrode disposed on the second side surface and electrically connected to the common conductor,
   the pair of capacitors is disposed in such a way that the first electrodes face each other in the second direction, and
   the common conductor surrounds the pair of capacitors and the pair of individual conductors when viewed from the first direction,
   wherein each of the pair of individual conductors includes a first portion electrically connected to the first electrode and a second portion connected to the first portion with a bent portion interposed between the first portion and the second portion, and
   a distance by which the second portions are spaced apart from each other in the second direction is longer than a distance by which the first portions are spaced apart from each other in the second direction.

2. The high voltage capacitor according to claim 1, wherein in a third direction orthogonal to the first direction and the second direction, a length of the second portion is longer than a length of the first portion.

3. The high voltage capacitor according to claim 1, further comprising:
   an insulating case accommodating the pair of capacitors; and a resin filled inside the insulating case and sealing the pair of capacitors.

4. The high voltage capacitor according to claim 3, wherein the resin includes insulating material.

5. The high voltage capacitor according to claim 2, wherein the resin is in contact with the common conductor and the pair of individual conductors.

6. The high voltage capacitor according to claim 3, wherein the resin includes a portion disposed between the pair of individual conductors.

7. The high voltage capacitor according to claim 1, wherein each of the pair of individual conductors further includes a third portion connected to the first portion with a bent portion interposed between the first portion and the third portion.

8. The high voltage capacitor according to claim 7, wherein a distance by which the third portions are spaced apart from each other in the second direction is longer than the distance by which the first portions are spaced apart from each other in the second direction.

9. The high voltage capacitor according to claim 1, wherein the common conductor is a metal fitting that is grounded.

10. The high voltage capacitor according to claim 1, wherein the common conductor includes a central portion and a peripheral portion surrounding the central portion, and
the central portion is thicker than the peripheral portion in the first direction.

11. A high voltage capacitor comprising:
a pair of capacitors;
a common conductor electrically connected to each of the pair of capacitors; and
a pair of individual conductors electrically connected to a corresponding capacitor of the pair of capacitors,
wherein each of the pair of capacitors comprises:
an element body having a columnar shape with a first direction as an axial direction, and including a first side surface and a second side surface facing away each other in a second direction orthogonal to the first direction;
a first electrode disposed on the first side surface and electrically connected to a corresponding individual conductor of the pair of individual conductors; and
a second electrode disposed on the second side surface and electrically connected to the common conductor,
the pair of capacitors is disposed in such a way that the first electrodes face each other in the second direction, and
the common conductor surrounds the pair of capacitors and the pair of individual conductors when viewed from the first direction,
wherein the element body and the common conductor are spaced apart from each other in a third direction orthogonal to the first direction and the second direction.

12. The high voltage capacitor according to claim 11, further comprising:
an insulating case accommodating the pair of capacitors; and
a resin filled inside the insulating case and sealing the pair of capacitors.

13. The high voltage capacitor according to claim 11, wherein the common conductor is a metal fitting that is grounded.

14. The high voltage capacitor according to claim 11, wherein the common conductor includes a central portion and a peripheral portion surrounding the central portion, and
the central portion is thicker than the peripheral portion in the first direction.

15. A high voltage capacitor comprising:
a pair of capacitors;
a common conductor electrically connected to each of the pair of capacitors; and
a pair of individual conductors electrically connected to a corresponding capacitor of the pair of capacitors,
wherein each of the pair of capacitors comprises:
an element body having a columnar shape with a first direction as an axial direction, and including a first side surface and a second side surface facing away each other in a second direction orthogonal to the first direction;
a first electrode disposed on the first side surface and electrically connected to a corresponding individual conductor of the pair of individual conductors; and
a second electrode disposed on the second side surface and electrically connected to the common conductor,
the pair of capacitors is disposed in such a way that the first electrodes face each other in the second direction, and
the common conductor surrounds the pair of capacitors and the pair of individual conductors when viewed from the first direction,
wherein the element body has a rectangular parallelepiped shape.

16. The high voltage capacitor according to claim 15, further comprising:
an insulating case accommodating the pair of capacitors; and
a resin filled inside the insulating case and sealing the pair of capacitors.

17. The high voltage capacitor according to claim 15, wherein the common conductor is a metal fitting that is grounded.

18. The high voltage capacitor according to claim 15, wherein the common conductor includes a central portion and a peripheral portion surrounding the central portion, and
the central portion is thicker than the peripheral portion in the first direction.

* * * * *